United States Patent [19]

Takahashi et al.

[11] Patent Number: 5,536,597
[45] Date of Patent: Jul. 16, 1996

[54] LITHIUM SECONDARY BATTERY EMPLOYING A NON-AQUEOUS ELECTROLYTE

[75] Inventors: Yuzuru Takahashi; Masatoshi Yoshimura, both of Tsukuba; Hideo Yamada, Tokyo, all of Japan

[73] Assignee: Mitsubishi Gas Chemical Company, Tokyo, Japan

[21] Appl. No.: 355,505

[22] Filed: Dec. 14, 1994

[30] Foreign Application Priority Data

Dec. 17, 1993 [JP] Japan .................... 5-318152

[51] Int. Cl.⁶ .................... H01M 4/36; C10B 31/00
[52] U.S. Cl. .................... 429/194; 429/218; 423/445 R; 423/448; 264/29.1
[58] Field of Search .................... 429/194, 218, 429/196, 197; 423/445, 448; 252/182.1, 502

[56] References Cited

U.S. PATENT DOCUMENTS

| | | | |
|---|---|---|---|
| 4,304,825 | 12/1981 | Basu | 429/103 |
| 4,423,125 | 12/1983 | Basu | 429/194 |
| 4,497,883 | 2/1985 | Murray | 429/218 X |
| 4,725,422 | 2/1988 | Miyabayashi et al. | 429/218 |
| 4,959,281 | 9/1990 | Nishi et al. | 429/194 |
| 5,093,216 | 3/1992 | Azuma et al. | 429/218 |
| 5,294,498 | 3/1994 | Omaru et al. | 429/122 |
| 5,326,658 | 7/1994 | Takahashi et al. | 429/194 |

FOREIGN PATENT DOCUMENTS

| | | |
|---|---|---|
| 208079 | 12/1982 | Japan . |
| 162331 | 8/1983 | Japan . |
| 235372 | 11/1983 | Japan . |
| 62-122066 | 7/1987 | Japan . |
| 3-245458 | 10/1991 | Japan . |
| 3-184066 | 8/1993 | Japan . |

*Primary Examiner*—Anthony Skapars
*Attorney, Agent, or Firm*—Leydig, Voit & Mayer, Ltd.

[57] ABSTRACT

A lithium secondary battery employing a non-aqueous electrolyte in which the anode material is prepared by calcining a precursor organic compound obtained from the reaction of at least one polycyclic organic compound with a compound containing nitrogen and sulfur.

21 Claims, No Drawings

LITHIUM SECONDARY BATTERY EMPLOYING A NON-AQUEOUS ELECTROLYTE

BACKGROUND OF THE INVENTION

1. Field of the Invention

The present invention relates to an improved lithium secondary battery employing a non-aqueous electrolyte and exhibiting superior capacity and charge-discharge characteristics.

2. Description of the Prior Art

In response to the trend toward miniaturization of electronic devices, it is necessary to improve the extent to which it is possible to realize higher capacities and greater safety and reliability, and various lithium secondary batteries using carbonaceous materials as the anode have been proposed. For example, methods of using graphite as anode material are disclosed by U.S. Pat. No. 4,304,825. Japanese Laid Open Patent Application Ser. No. 1982-208079. U.S. Pat. No. 4,423,125. Japanese Laid Open Patent Application No. 1983-102464 or Japanese Laid Open Patent Application Ser. No. 1992-190555. However, since graphite contains crystallites, the intercalation and deintercalation of lithium ions damage these crystallites and impair reversibility. Additionally, the high reactivity of the lithium-intercalated anode material causes the decomposition of the electrolyte, and that, in turn, causes considerable internal short circuiting. These defects make the resulting batteries inconvenient and difficult to use.

On the other hand, carbon materials having a high surface area, such as activated carbon, are disclosed by U.S. Pat. No. 4,497,883. Batteries made in accordance therewith make use of electric double layer formation based on the high surface area of the activated carbon. However, such defects as low charge-discharge efficiency and a low battery voltage are observed when secondary batteries are made using such materials as the anode.

To overcome these obstacles, the use of carbonaceous materials differing from graphite with its crystallites and carbonaceous materials such as activated carbon with their large surface area as anodes has been proposed. More concretely, it has been proposed that materials be categorized by the temperature of calcination used to produce them, and methods using calcinated organic compounds obtained by subjecting the said organic compounds to calcination temperatures of 1500° C. or less as anode materials have been disclosed in Japanese Laid Open Patent Application Ser. No. 1983-93176 and Japanese Laid Open Patent Application Ser. No. 1985-235372. Moreover, the use of carbon fibers obtained by calcination at temperatures around 2000° C. as the anode is disclosed in Japanese Laid Open Patent Application Ser. No. 1985-54181, and the use of carbonaceous material having graphite structure that has been calcined at from 1000° C. to 2500° C. as anode material has been disclosed in Japanese Laid Open Patent Application Ser. No. 1985-221973. On the other hand, a carbonaceous material having a pseudo-graphite structure in which, according to x-ray diffraction spectroscopy, the inter layer separation distance ($d_{002}$) is 3.37 Å or more and the size of the crystallite c-axis ($Lc_{002}$) is 150 Å or less is disclosed in Japanese Laid Open Patent Application Ser. No. 1987-122066. Moreover, the use as anode material of carbonaceous material falling within the scope of a relative surface area A (m²/g) represented by $0.1<A<100$, and $Lc_{002}$ and true density, $\rho$, the values for which satisfy the relations $1.70<\rho<2.18$ and $10<Lc_{002}<120\rho-189$ are disclosed in Japanese Laid Open Patent Application Ser. No. 1987-90863. Additionally, Japanese Laid Open Patent Application Ser. No. 1990-66856 discloses a ($d_{002}$) of 3.70 Å or less, and a $\rho$ value of less than 1.70 (g/cm³) that moreover does not exhibit an exothermic differential thermal analysis peak at 700° C. or above. Among these carbon materials, various improvements have been made and some of them have been put into practical use: however, none of them as yet exhibit adequate capacity.

Then, it was proposed that high capacity be achieved by adjusting the content of elements other than carbon present in the material to optimum levels. For example, Japanese Laid Open Patent Application Ser. Nos. 1991-137010 and 1993-74457 disclose carbonaceous materials containing the element phosphorus, and Japanese Laid Open Patent Application Ser. No. 1991-245458 discloses a carbonaceous material containing boron. Additionally, U.S. Pat. Ser. No. 5,326,658 discloses as an anode material having a high capacity, a carbonaceous material containing nitrogen made by the calcination of an organic precursor compound obtained by reacting a conjugated polycyclic compound with a nitrocompound or a nitrating agent. Japanese Laid Open Patent Application Ser. No. 1992-278751 discloses a sulfur containing carbonaceous anode material. However, adequate realization of a battery possessing a capacity that could suitably meet the demands of long term use in portable devices even by the use of carbonaceous materials listed above, was not possible, and it became necessary to find a carbonaceous material having a higher capacity.

As stated above, lithium secondary batteries made using the anode materials composed of the carbonaceous materials of the prior art do not exhibit adequate capacity. The objective of the present invention is to solve the problems of the prior art and by so doing to offer a high performance lithium secondary battery that has greater capacity, improved charge-discharge cycle characteristics and superior stability and safety.

DETAILED DESCRIPTION OF THE INVENTION

The inventors of the present invention, to achieve the objectives stated above, conducted their investigation based upon various existing experiments and investigations and prepared a carbonaceous material that included nitrogen in accordance with Japanese Patent Application Ser. No. 1992-278479, preparing it so that it had a particular type of bonding between the carbon atoms and nitrogen atoms and so that it was usable as a superior anode material. Additionally, they understood that if in accordance with what was written in Japanese Patent Application Ser. No. 1992-278751, a certain amount of sulfur was included in the carbonaceous material, that material would be a superior anode material. Because of the presence of nitrogen or sulfur contained as an impurity in the raw materials used to make these carbon materials, a carbonaceous material was obtained by the inventors that simultaneously satisfied the conditions of both of the aforementioned patent applications and a striking, greater than expected increase in function was observed.

Then, the inventors of the present invention searched for a method of obtaining a carbonaceous material satisfying simultaneously the conditions stated in the above two patent applications by altering the composition of various organic compounds through the addition of compounds containing nitrogen and sulfur. As a result, and to their surprise, the carbonaceous material obtained by calcining precursor organic compounds obtained from the reaction of a conjugated polycyclic compound such as pitch with a nitrogen containing compound and a sulfur containing compound was considerably superior to those of the prior art. By using this material as an anode material, they were able to prepare a superior lithium secondary battery and in so doing achieved their objective.

The anode material used in the lithium secondary battery of the present invention is a carbonaceous material prepared by calcining a precursor organic compound obtained by reacting at least one conjugated polycyclic compound with a compound containing nitrogen and sulfur.

The conjugated polycyclic compound may be a conjugated polycyclic hydrocarbon such as naphthalene, anthracene, pyrene, coronene or the like or their derivatives: a conjugated heteropolycyclic compound such as benzofuran, quinoline, thionaphthalene, silanaphthalene or their derivatives, compounds derived by linking any of the foregoing compounds together: or, additionally, tars, synthetic pitch, coal tar pitch, petroleum pitch, cokes, petroleum or related heavy oils that are composed partially or completely of or contain the foregoing compounds or mixtures thereof. Pitch or tar having a softening point of 170° C. or less are preferred as the conjugated polycyclic compound. Optimization of conditions and pretreatment depending upon the kind of conjugated polycyclic compound are also desirable. For example, where naphthalene is used, it is desirable to synthesize pitch or tar having a softening point of 170° C. or less from naphthalene using HF and $BF_3$ as a catalyst.

The compound containing nitrogen and sulfur contains both elements in the same molecule.

As the compound containing nitrogen and sulfur of the present invention, ammonium sulfate, ammonium persulfate, acid ammonium sulfate and the like may be used, however, from the standpoint of cost and safety, ammonium sulfate is preferred. The amount of the included nitrogen and sulfur should be optimized with respect to the amount of polycyclic compound used. For example, in the case of ammonium sulfate and pitch, a ratio by weight of ammonium sulfate to pitch of on the order of 0.1:1 to 3:1 is preferred, and, in the case of ammonium sulfate to tar, a ratio by weight of ammonium sulfate to tar of 0.05 to 2 is preferred. The temperature of reaction for the ammonium sulfate and the conjugated polycyclic compound should be the optimum reaction temperature for the particular reactants concerned. These optimum values generally fall within the range of 200° C. to 600° C.

The method of reacting the conjugated polycyclic compound with the nitrogen and sulfur containing compound is the optimum method for reaction depending upon the particular reactants. For example, where naphthalene is used, after reacting it to form pitch as described above, the pitch obtained may be reacted with ammonium sulfate and it is also possible to add dinitronaphthalene in addition to the ammonium sulfate. In addition, nitrocompound, a nitrating agent, ammonium sulfate, sulfur, sulfuric acid or a mixture of sulfuric and fuming sulfuric acid and various hardeners may be added. The nitration reaction by a nitrating agent of the present invention should be the optimum nitration reaction for the particular organic compound used. In addition, a lithium salt may be added in accordance with Japanese Patent Application No. 1993-184066 to the organic precursor compound prepared as described herein for the purpose of reducing capacity loss when the anode material is used in the preparation of a battery to obtain a more superior anode material.

The carbonaceous material for anode use of the present invention is obtained by calcination of the lithium containing compound under an atmosphere of inert gas or a vacuum. The calcination temperature is between 800° C. to 1800° C. and preferably 1000° C. to 1300° C. The calcination period is from 0.1 hour to 50 hours, and more preferably from 1 hour to 5 hours optimally determined based upon the characteristics of the precursor organic compound and other reactants. Additionally, a precalcination at a temperature of 800° C. or less may be conducted. The inert gas is preferably nitrogen and is supplied in a continuous flow that, upon exiting, carries away the waste gas of calcination. Reaction under vacuum results in stronger removal of the reaction product gases allowing their disposal as waste gas, but calcination conducted where the partial vapor pressure of the gas generated is maintained at 30 mm Hg or less is preferred.

The carbonaceous material thus obtained contains nitrogen and sulfur in appropriate amounts. Nitrogen is usually present within the range of from 0.1 wt % to 6 wt % and preferably within the range of from 0.3 wt % to 4 wt %. Additionally, most of this nitrogen, when observed using x-ray photoelectron spectroscopy, occurs in certain specific forms, the bonding of which generates 2 peaks appearing in the vicinity of 399 eV (more precisely within the range of 398.8±0.4 eV) and 401 eV (more precisely within the range of 401.2±0.2 eV), due to carbon-nitrogen bonding. Of all of the bonding involving nitrogen in the anode material of the present invention, 80% or more is represented by the 2 peaks appearing in the vicinity of binding energies corresponding to 399 eV and 401 eV respectively. The amount of sulfur present is preferably within the range of from 0.1 wt % to 6 wt %, and 2 peaks at binding energies of 164.1±0.2 eV and 165.3±0.2 are observed for sulfur using x-ray photoelectron spectroscopy.

The parameters of crystallinity of the carbonaceous material of the present invention depend upon the structural conditions of the material. However, usually, the inter layer spacing ($d_{002}$) is 3.4 Å or more and the size of the crystallites $Lc_{002}$ is 70 Å or less. The true density is in the range of from 1.4 $g/cm^3$ to 2.0 $g/cm^3$.

The carbonaceous material of the present invention possesses various excellent properties as anode material, and, in particular, it has a substantially higher capacity than the carbonaceous materials of the prior art. In particular, in the range of 0 to 0.2 volts (V), it is 300 mAh/g or more and between 0 and 1.5 volts (V), it is possible to obtain a capacity of 500 mAh/g or more.

The construction of the secondary battery employing a non-aqueous media of the present invention that uses the aforementioned carbonaceous material as the anode is an anode using the carbonaceous material of the present invention as an anode, and a cathode, separator, non-aqueous electrolyte and casing as described below.

The method of using the carbonaceous material of the present invention as the anode is not particularly limited.

For example, an electrode may be prepared by mixing a binder with the powdered anode material of the present invention, using a solvent where required, and then pressing the electrode material onto a collector after it has been formed into a sheet or by coating it directly onto the collector. Moreover, as the binder, any type of pitch may be used, and the plate type electrode obtained by calcining a mixture of the pitch with the powdered anode material has been used effectively. The cathode material is not particularly limited. For example, such lithium containing oxides as $LiCoO_2$, $LiNiO_2$, $LiMnO_2$, $LiMn_2O_4$ and the like, such oxides as $TiO_2$, $V_2O_5$, $MoO_3$, $MnO_2$, such sulfides as $TiS_2$, $FeS$, and $MoS_3$ and such selenides as $NbSe_3$, or such conductive polymers as polyacetylene, polyparaphenylene, polypyrrole and polyani line or activated carbon maybe used. The method of using these cathode materials as the cathode is not particularly limited. For example, a cathode may be prepared by mixing a binder with the powdered cathode material of the present invention, using a solvent where required, and then pressing the cathode material onto a collector after it has been formed into a sheet or by coating it directly onto the collector. The separator that may be used is not particularly limited. For example, the separator may be made of synthetic or glass fiber or natural fiber either unwoven or in the form of cloth, and micro porous resin and the like may also be used.

In the secondary battery employing a non-aqueous media of the present invention either an organic liquid electrolyte or solid electrolyte may be used. A solution of a lithium salt dissolved in an organic solvent having a high dielectric constant may be used. The kind of lithium salt that may be used is not particularly limited, and, for example, $LiClO_4$, $LiPF_6$ or $LiSbF_6$ may be used either singly or as mixtures of two or more in appropriate proportions. The organic solvent that may be used for the electrolyte is one that is able to dissolve the applicable lithium salt or salts and preferably is non-protic and has a high dielectric content, and nitriles, carbonates, ethers, nitrocompounds, sulfur containing compounds, chlorinated compounds, ketones, esters and the like may be used. More concretely, for example, acetonitrile, propionitrile, propylenecarbonate, ethylenecarbonate, diethylcarbonate, dimethylcarbonate, tetrahydrofuran, dioxane, 1,2-dimethoxyethane, nitromethane, N, N-dimethylformamide, dimethylsulfoxide, sulfolane, and γ-butyrolactone may be used singly or in mixtures of two or more as mixed electrolytes depending upon the requirements of the particular situation. The battery casing is usually constructed of stainless steel plate or nickel plated material but may also be constructed of multi-layer materials constructed from synthetic resin and insulating inorganic membranes.

The examples of the present invention and comparative experiments are recorded below, and the results are concretely and specifically explained. These examples and comparative experiments are provided for the purpose of concrete explanation of the present invention and do not in any way limit the manner in which the present invention may be practiced or the scope of the present invention. Moreover, the analysis methods and analysis conditions for the anode material to be used in the present invention are recorded below.

1. Particle Size Distribution Measurement

The equipment used was a Horiba, Ltd. LA-500 Laser Diffraction Type Powder Size Distribution Measuring Device. The measurement was performed by adding 3 drops of surface active agent to 100 ml of pure water and then adding the sample to this mixture until it reached a predetermined concentration. After subjecting the sample to ultrasonic sound wave dispersion for 10 minutes, the measurement was taken and the median diameter obtained was used as the average particle diameter.

2. Elemental Analysis

The analytical equipment used was a PERKIN-ELMER 2400 CHN type elemental analysis device. The measurement was per formed by placing 1.5±0.2 mg of the test anode material in a small tin cup in the instrument, calcining the sample at a temperature of 975° C. for 5 minutes. The measurement was performed by TCD using helium as the carrier gas. To establish correspondence between sample measurements and standard test values, the device was calibrated for the sample using acetanilide (2.0±0.1 mg) as the standard.

Analysis for sulfur content was conducted using a 3270 type fluorescent x-ray diffraction device. Measurement was conducted using a sample of anode material having 0.66 grams after sufficiently mixing it with dilutant cellulose weighed at 1.34 grams (Whatman CF11 made by W&R Balston). The sample was formed by the addition of pressure at 24 tf and was then placed in the measuring device and analysis was conducted. The measurement was conducted using a Toshiba Cr lamp as the x-ray lamp and using a Germanium diffraction crystal having an output of 50 kV-50 mA. Moreover, with respect to the specified quantity of sulfur test sample, at first, a standard sample containing a known quantity of added sulfur was analyzed 3. Elemental Analysis (Lithium)

Analysis of lithium content was conducted by means of inductively coupled plasma analysis (ICP analysis). The equipment was an SPS-1200 VR type manufactured by Seiko Electronics Industries, Preparation of the sample consisted of reducing the anode material to ash at 900° C. in a muffle furnace, dissolving the residue in 1N aqueous hydrochloric acid, and then conducting the measurement. An absolute calibration curve was prepared using standard solutions prepared using determined amounts of lithium.

4. X-ray Photoelectron Spectroscopy Analysis

The equipment used was a V. G. Scientific ESCALAB MK-II. The analysis was performed using $Mg$-$K_\alpha$ as the x-ray source at 15 KV–20 mA and using an Al slit (2×5 mm). Preparation for analysis consisted of placing the sample on double sided tape. Measurement was conducted with the sample in this condition, or, in some cases, after argon etching of the sample surface. The analysis was performed by measuring each peak precisely within a narrow range after first measuring all of the peaks over a broad range and identifying individual peaks. The charge up correction was made by setting the observed carbon 1s energy ("C-1s") at 284.4 eV and adjusting the value for each peak accordingly.

4. True Density

True density was determined by the float and sink method using a carbon tetrachloride-bromoform mixture at 25° C.

EXAMPLES 1

Thirty parts by weight of ammonium sulfate were added to 70 parts by weight of tar (manufactured by Kawasaki Steel Company) at 100° C. and the temperature was raised to 400° C. after mixing them together. This compound was powdered using a ball mill. The black powder thus obtained was then calcined for 2 hours at 1000° C. under a stream of nitrogen gas to obtain a powdered anode material with a particle diameter of 10μ. This anode material contained 93.5 wt % carbon, 1.19 wt % of nitrogen and 1.62 wt % of sulfur. The result of XPS measurement was 2 peaks representing binding energies of 401.4 eV and 398.6 eV having an intensity ratio (the intensity of the 401.4 eV peak/the intensity of the 398.6 eV peak) of 2.5 which peaks accounted for 100% of the bonding involving nitrogen observed in the anode material. Moreover, peaks with a binding energy of 164.1 eV and 165.3 eV based on sulfur bonding were observed.

Evaluation of the Anode Material

A flexible shaped article for use as a test electrode was prepared by mixing 100 parts by weight of the powdered anode material thus obtained with 5 parts by weight of polytetra-fluoroethylene (binder) and compressing them into a round disk. A half cell was prepared using this test electrode, according to the usual methods, using $LiClO_4$ dissolved in a solvent composed of an equal volume mixture of propylene carbonate and 1,2-dimethoxyethane (concentration of $LiClO_4$: 1.0 mol/l) prepared as an electrolyte and using a separator made from a porous polypropylene membrane with a thickness of 50 µm. As the counter electrode, a 16 mm diameter, 0.5 mm thick disk of lithium metal was used. A small piece of lithium metal similar to the counter electrode was used as the reference electrode.

The first cycle circuit potential of the half cell obtained above was 3.18 V (volts). Subsequently, the half cell was charged at a constant current density of 1.0 mA/cm$^2$ until there was no change in the potential of the test electrode with respect to the reference electrode. The charge capacity was 707 mAh/g. Then, the half cell was discharged at a constant current density of 1.0 mA/cm$^2$, and by the time the electrode reached 0.2 V, the observed discharge capacity was 318 mAh/g, by the time the electrode potential reached 1.5V, the observed discharge capacity was 529 mAh/g and finally, when discharging had proceeded sufficiently for the electrode potential to reach 3.0 V, the observed discharge capacity was 542 mAh/g.

Evaluation of the Secondary Battery

A test electrode with a thickness of 0.3 mm, a diameter of 15 mm and a weight of 90 mg prepared by the same methods as the above test electrode was used as the anode, and using $LICIO_4$ dissolved in a solvent composed of an equal volume mixture of propylene carbonate and 1,2-dimethoxyethane ($LiCIO_4$: 1.0 mol/l) prepared as an electrolyte and using a separator made from a porous polypropylene membrane with a thickness of 50 µm, a secondary battery was prepared. The cathode was prepared by mixing 85 parts by weight of $LiCoO_2$ with 10 parts by weight of acetylene black (conducting agent) and 5 parts by weight of polytetrafluoroethylene (binder) and compressing the mixture into a disk (diameter 14 mm).

The circuit voltage for the initial cycle of the secondary battery thus obtained was 0.03 V. When, after charging at a constant current until the charging voltage at a current density of 1.0 mA/cm$^{-2}$ reached 4.10 V, the battery was then discharged at a constant current until the charging voltage at a current density of 1.0 mA/cm$^2$, an initial discharge capacity of 32.4 mAh was observed.

EXAMPLE 2

1 mole of naphthalene, 0.5 moles of hydrofluoric acid and 0.5 moles of boron trifluoride $BF_3$ were added to an acid resistant autoclave having a capacity of 500 ml and, after the temperature was raised to 200° C. at a pressure of 25 kg/cm$^3$ it was maintained under these conditions for 2 hours and reacted. Then, according to the usual methods the interior of the autoclave was charged with nitrogen, the HF and $BF_3$ were flushed out and recovered and after the low boiling point components were driven off, a pitch having a softening point of about 115° C. was obtained. Then 70 parts by weight of the pitch having a softening point of 115° C. thus obtained were added to 30 parts by weight of ammonium sulfate while heating the mixture to 180° C. after which the temperature was raised to 270° C. The reaction mixture was allowed to cool and the compound thus obtained was ground to a powder using a ball mill. Then, the black powder thus obtained was calcined for two hours at 1000° C. under a flow of nitrogen gas to obtain an anode material in powdered form. This anode material contained 94.5 wt % carbon, 1.23 wt % of nitrogen and 2.13 wt % of sulfur. The result of XPS measurement was 2 peaks representing binding energies of 401.4 eV and 398.6 eV having an intensity ratio (the intensity of the 401.4 eV peak/the intensity of the 398.6 eV peak) of 2.6 which peaks accounted for 100% of the bonding involving nitrogen observed in the anode material. Moreover, a half cell and secondary battery were prepared according to the same procedures used in Example 1, and when constant current charge—discharge experiments were conducted, the results obtained were the same as those for Example 1.

EXAMPLE 3

20 parts by weight of acid ammonium sulfate were added to 100 parts by weight of tar at a temperature of 100° C. and mixed after which the temperature was raised to 400° C. The resulting compound was cooled and ground using a ball mill. Then, the black powder thus obtained was calcined for 2 hours at 1100° C. under a flow of nitrogen gas and a powdered anode material was obtained. This anode material contained 92.5 wt % carbon, 1.05 wt % of nitrogen and 1.23 wt % of sulfur. The result of XPS measurement was 2 peaks representing binding energies of 401.4 eV and 398.6 eV having an intensity of the 398.6 eV peak) of 2.5 which peaks accounted for 100% of the bonding involving nitrogen observed in the anode material. Moreover, peaks with a binding energy of 164.1 eV and 165.3 eV based on sulfur bonding were observed.

A half cell was prepared in the same way as in Example 1 and, when constant current charge—discharge experiments were conducted, the charge capacity was 640 mAh/g. Then the capacity up to the point the electrode potential rose to 0.2 V was 320 mAh/g, the discharge capacity up to the point the electrode potential rose to 1.5 V was 510 mAh/g and the capacity up to the point the electrode potential rose to 3.0 V was 532 mAh/g. Then, a secondary battery was prepared in the same way as in Example 1. When constant current charge —discharge experiments were conducted, the initial cycle voltage was 0.03 V and the initial capacity was 32.8 mAh.

EXAMPLE 4

A black powder obtained after grinding the compound obtained in Example 1 to a powder using an impact powderer was calcined at 1200° C. for 2 hours under a vacuum of 30 mg Hg or less to obtain an anode material having an average particle size of 13 µ. This anode material contained 92.1 wt. % carbon. 0.74 wt. % of nitrogen and 0.93 wt. % of sulfur. The result of XPS measurement was 2 peaks representing binding energies of 401.4 eV and 398.6 eV having an intensity ratio (the intensity of the 401.4 eV peak/ the intensity of the 398.6 eV peak) of 2.5 which peaks accounted for 100% of the bonding involving nitrogen observed in the anode material. Moreover, peaks with a binding energy of 164.1 eV and 165.3 eV based on sulfur bonding were observed.

Moreover, a half cell was prepared in the same way as in Example 1 and, when constant current (2 mA/cm$^2$—constant potential experiments were conducted, and when the total time had reached 20 hours, the charge capacity was 610 mAh/g. Then up until the electrode potential of the test electrode against a reference electrode where discharge was conducted at a current density of on the order of 1.0 mA/cm² rose to 0.2 V the capacity was 320 mAh/g, the discharge capacity up to the point the electrode potential rose to 1.5 V was 503 mAh/g and the capacity up to the point the electrode potential rose to 3.0 V was 528 mAh/g.

Then, a secondary battery was prepared in the same way as in Example 1. When constant current charge—discharge experiments were conducted, the initial capacity was 33.4 mAh.

EXAMPLE 5

70 parts by weight of tar (manufactured by Kawasaki Steel Company). 30 parts by weight of ammonium sulfate and 5 parts by weight of lithium carbonate were heated to 100° C. and mixed, and then the after the temperature was raised to 400° C. a lithium containing compound composed of 1.0% lithium was obtained. This compound was ground to a powder using a ball mill. The black powder thus obtained was calcined under a stream of nitrogen gas to obtain the powdered anode material. This anode material contained 0.9 wt. % lithium. 92.6 wt. % of carbon, 1.19 wt. % of nitrogen and 0.9 wt. % of sulfur. The result of XPS measurement was 2 peaks representing binding energies of 401.4 eV and 398.6 eV having an intensity ratio (the intensity of the 401.4 eV peak/ the intensity of the 398.6 eV peak) of 2.5 which peaks accounted for 100% of the bonding involving nitrogen observed in the anode material. Moreover, peaks with a binding energy of 164.1 eV and 165.3 eV based on sulfur bonding were observed.

A half cell was prepared in the same way as in Example 1 and, when constant current charge—discharge experiments were conducted, the charge capacity was 620 mAh/g. Then the capacity up to the point the electrode potential rose to 0.2 V was 312 mAh/g, the discharge capacity up to the point the electrode potential rose to 1.5 V was 519 mAh/g and the capacity up to the point the electrode potential rose to 3.0 V was 535 mAh/g. Charge discharge cycle loss was 85 mAh/g. Then, a secondary battery was prepared in the same way as in Example 1. When constant current charge—discharge experiments were conducted, the initial cycle voltage was 0.03 V and the initial capacity was 34.2 mAh.

COMPARATIVE EXPERIMENT 1

Thirty parts by weight of dinitronaphthalene were added to 70 parts by weight of tar (manufactured by Kawasaki Steel Company) at 150° C. and the temperature was raised to 500° C. after mixing them together. This compound was powdered using a ball mill. The black powder thus obtained was then calcined for 2 hours at 1150° C. under a stream of nitrogen gas to obtain a powdered anode material with a particle diameter of 10 μ. This anode material contained 95.73 wt. % carbon, 0.13 wt. % hydrogen 0.91 wt. % nitrogen and 0.42 wt. % sulfur.

Subsequently, when a half cell was prepared as in Example 1 and charge—discharge experiments were conducted at constant current and the initial charge discharge capacity was 610 mAh/g. By the time the electrode potential of the test electrode against a reference electrode reached 0.2 V, the observed discharge capacity was 312 mAh/g. By the time the electrode potential reached 1.5 V, the observed discharge capacity was 486 mAh/g and by the time it had reached 3.0 V, the discharge capacity was 498 mAh/g. Next, a secondary battery was prepared using the same methods as in Example 1, except for the use of the anode material obtained above. When charge—discharge experiments were conducted at constant voltage, the initial period circuit voltage was 0.03 V and the initial period discharge capacity was 29.7 mAh. The carbonaceous material of the present invention was obtained by the calcination of only a precursor organic compound obtained by reacting a conjugated polycyclic compound with a nitrogen containing compound (an aromatic nitrate under the conditions described in Japanese Patent Application Ser. No. 1992-258479) and because the amount of sulfur present in the material present was only at the level of an impurity and was therefore too small, an initial period discharge capacity of only 498 mAh/g was obtained.

COMPARATIVE EXPERIMENT 2

One hundred fifty parts by weight of 97% sulfuric acid and 150 parts fuming sulfuric acid were added to 100 parts by weight of tar (manufactured by Kawasaki Steel Company) at 80° C. at which they were maintained for one hour, after which the temperature was raised to 150° C. and the mixture reacted for one hour. The resulting reaction mixture was filtered, washed with water and dried to obtain a sulphonated pitch. The sulphonated pitch thus obtained was the calcined for 2 hours at 1000° C. under a stream of nitrogen gas to obtain a black calcined mass. This calcined mass was powdered using a ball mill and then calcined again for 2 hours at 1000° C. under a stream of nitrogen gas and a powdered anode material with a particle diameter of 10 μ was obtained. This anode material contained 94.10 wt. % carbon, 0.03 wt. % hydrogen, 0.2 wt. % of nitrogen and 2.41 wt. % of sulfur. The result of XPS measurement was 2 S-1s peaks representing binding energies of 164.1 eV and 165.3 eV based on sulfur bonding were observed.

Subsequently, when a half cell was prepared in Example 1 and charge—discharge experiments were conducted at constant current, the charge—discharge capacity was 615 mAh/g. By the time the electrode potential of the test electrode against a reference electrode reached 0.2 V, the observed discharge capacity was 304 mAh/g. By the time the electrode potential reached 1.5 V, the observed discharge capacity was 473 mAh/g and by the time it had reached 3.0 V, the discharge capacity was 485 mAh/g. Next, a secondary battery was prepared using the same methods as in Example 1, except for the use of the anode material obtained above. When charge—discharge experiments were conducted at constant voltage, the initial period circuit voltage was 0.03 V and the initial period discharge capacity was 28.9 mAh. The carbonaceous material of this comparative example was obtained by the calcination of only a precursor organic compound obtained by reacting a conjugated polycyclic compound with a sulfur containing compound and because the amount of nitrogen present in the material is at the level of an impurity (and was therefore too small), an initial period discharge capacity of only 485 was obtained.

Effects of the Present Invention

The secondary battery of the present invention, compared with those of the prior art, is less prone to experience a deterioration of performance over time, and the secondary battery of the present invention shows excellent safety and has excellent charge—discharge characteristics in addition to its large capacity.

What is claimed is:

1. A lithium secondary battery employing a non-aqueous electrolyte wherein the anode material is prepared by calcining a precursor organic compound obtained from the reaction of at least one polycyclic organic compound with a compound containing nitrogen and sulfur, said anode material containing 0.1% to 6% by weight of nitrogen, at least 80% of which is bonded by C—N or C=N bonds, and in which the x-ray photoelectron spectroscopy binding energy peaks observed for nitrogen atoms are present at 401.2±0.2 eV and 398.8±0.4 eV in an intensity ratio of the former to the latter of 1.0 or more, and containing between 0.1% and 6% by weight of sulfur and in which the x-ray photoelectron spectroscopy binding energy peaks observed for sulfur atoms are present at 164.1±0.2 eV and 165.3±0.2 eV.

2. A lithium secondary battery employing a non-aqueous electrolyte according to claim 1 wherein the compound containing nitrogen and sulfur is selected from the group consisting of ammonium sulfate, acid ammonium sulfate and ammonium persulfate.

3. A lithium secondary battery employing a non-aqueous electrolyte according to claim 2 wherein the compound containing nitrogen and sulfur is ammonium sulfate.

4. A lithium secondary battery employing a non-aqueous electrolyte according to claim 1 wherein the polycyclic organic compound is tar or pitch having a softening point of 170° C. or less.

5. A lithium secondary battery employing a non-aqueous electrolyte according to claim 1 wherein the anode material is prepared by calcining the precursor organic compound at from 800° C. to 1800° C. under an atmosphere of non-reactive gas.

6. A lithium secondary battery employing a non-aqueous electrolyte according to claim 1 in which the $d_{002}$ inter layer spacing of the anode material is 3.4 Å or more and the size of the crystallites. $Lc_{002}$, is 70 Å or less.

7. A lithium secondary battery according to claim 6 where true density of the anode material is in the range of from 1.4 g/cm$^3$ to 2 g/cm$^3$.

8. An anode material for a lithium secondary battery employing a non-aqueous electrolyte prepared by calcining a precursor organic material obtained from the reaction of at least one polycyclic organic compound with a compound containing nitrogen and sulfur, said anode material containing from 0.1% to 6% by weight of nitrogen, at least 80% of which is bonded by C—N or C=N bonds, and in which the x-ray photoelectron spectroscopy binding energy peaks observed for nitrogen atoms are present at 401.2±0.2 eV and 398.8±0.4 eV in an intensity ratio of the former to the latter of 1.0 or more, and between 0.1% and 6% by weight of sulfur and in which the x-ray photoelectron spectroscopy binding energy peaks observed for sulfur atoms are present at 164.1±0.2 eV and 165.3±0.2 eV.

9. An anode material for a lithium secondary battery employing a non-aqueous electrolyte according to claim 8 wherein the compound containing nitrogen and sulfur is selected from the group consisting of ammonium sulfate, acid ammonium sulfate and ammonium persulfate.

10. An anode material for a lithium secondary battery employing a non-aqueous electrolyte according to claim 9 wherein the compound containing nitrogen and sulfur is ammonium sulfate.

11. An anode material for a lithium secondary battery employing a non-aqueous electrolyte according to claim 8 wherein the polycyclic organic compound is tar or pitch having a softening point of 170° C. or less.

12. An anode material for a lithium secondary battery employing a non-aqueous electrolyte according to claim 8 wherein the anode material is prepared by calcining the precursor organic compound at from 800° C. to 1800° C. under an atmosphere of non-reactive gas.

13. An anode material for a lithium secondary battery according to claim 8 in which the $d_{002}$ inter layer spacing of the anode material is 3.4 Å or more and the size of the crystallites, $Lc_{002}$, is 70 Å or less.

14. An anode material for a lithium secondary battery employing a non-aqueous electrolyte according to claim 13 where true density is in the range of from 1.4 g/cm$^3$ to 2 g/cm$^3$.

15. An anode material in sheet form for use in the preparation of anodes for a secondary battery, which anode material is prepared by calcining an a precursor organic compound obtained from the reaction of at least one polycyclic organic compound with a compound containing nitrogen and sulfur, said anode material containing 0.1% to 6% by weight of nitrogen, at least 80% of which is bonded by C—N or C=N bonds, and in which the x-ray photoelectron spectroscopy binding energy peaks observed for nitrogen atoms are present at 401.2±0.2 eV and 398.8±0.4 eV in an intensity ratio of the former to the latter of 1.0 or more, and containing between 0.1% and 6% by weight of sulfur and in which the x-ray photoelectron spectroscopy binding energy peaks observed for sulfur atoms are present at 164.1±0.2 eV and 165.3±0.2 eV.

16. A An anode material in sheet form for use in the preparation of anodes for a secondary battery according to claim 15 wherein the compound containing nitrogen and sulfur is selected from the group consisting of ammonium sulfate, acid ammonium sulfate and ammonium persulfate.

17. An anode material in sheet form for use in the preparation of anodes for a secondary battery according to claim 16 wherein the compound containing nitrogen and sulfur is ammonium sulfate.

18. An anode material in sheet form for use in the preparation of anodes for a secondary battery according to claim 15 wherein the polycyclic organic compound is tar or pitch having a softening point of 170° C. or less.

19. An anode material in sheet form for use in the preparation of anodes for a secondary battery according to claim 15 wherein the anode material is prepared by calcining the precursor organic compound at from 800° C. to 1800° C. under an atmosphere of non-reactive gas.

20. An anode material in sheet form for use in the preparation of anodes for a secondary battery according to claim 15 in which the $d_{002}$ inter layer spacing of the anode material is 3.4 Å or more and the size of the crystallites. $Lc_{002}$, is 70 Å or less.

21. An anode material in sheet form for use in the preparation of anodes for a secondary battery according to claim 20 where true density of the anode material is in the range of from 1.4 g/cm$^3$ to 2 g/cm$^3$.

\* \* \* \* \*

UNITED STATES PATENT AND TRADEMARK OFFICE
CERTIFICATE OF CORRECTION

PATENT NO. : 5,536,597
DATED : July 16, 1996
INVENTOR(S) : Takahashi et al.

It is certified that error appears in the above-identified patent and that said Letters Patent is hereby corrected as shown below:

Column 6, line 29, "4." Should be on line 30 to start new analysis method.

Column 6, line 24, "4. True Density" should read --5. True Density--.

Column 8, line 29, after "having an intensity" insert --ratio (the intensity of the 401.4 eV peak/the intensity--.

Column 9, line 6, "528 mAh/g" should read --526 mAh/g--.

Column 9, line 17, after "and then" delete the first occurrence of "the".

UNITED STATES PATENT AND TRADEMARK OFFICE
CERTIFICATE OF CORRECTION

PATENT NO. : 5,536,597
DATED      : July 16, 1996
INVENTOR(S): Takahashi et al.

It is certified that error appears in the above-identified patent and that said Letters Patent is hereby corrected as shown below:

Column 10, line 10, after "material" delete "present".

Column 12, line 32, "A An anode material in sheet" should read --An anode material in sheet--.

Column 12, line 53, "crystallites." Should read --crystallites,--.

Signed and Sealed this

Fourteenth Day of January, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,536,597
DATED : July 16, 1996
INVENTOR(S) : Takahashi et al.

It is certified that error appears in the above-identified patent and that said Letters Patent is hereby corrected as shown below:

ON THE TITLE PAGE:

[73] Assignee: Mitsubishi Gas Chemical Company" should read --Mitsubishi Gas Chemical Company, Inc.--.

Signed and Sealed this

Sixth Day of May, 1997

*Attest:*

BRUCE LEHMAN

*Attesting Officer*   Commissioner of Patents and Trademarks